United States Patent [19]

Levatter

[11] Patent Number: 5,015,067

[45] Date of Patent: May 14, 1991

[54] OPTICAL FIBER POWER OUTPUT MEASURING MEANS

[75] Inventor: Jeffrey I. Levatter, San Diego, Calif.

[73] Assignee: Acculase, Inc., San Deigo, Calif.

[21] Appl. No.: 294,989

[22] Filed: Jan. 6, 1989

Related U.S. Application Data

[63] Continuation of Ser. No. 144,181, Jan. 15, 1988, abandoned.

[51] Int. Cl.⁵ .......................... G02B 6/02; G02B 6/16
[52] U.S. Cl. .................................................. 350/96.29
[58] Field of Search ...................................... 350/96.29

[56] References Cited

U.S. PATENT DOCUMENTS

| | | | |
|---|---|---|---|
| 4,403,826 | 9/1983 | Presby | 350/96.30 |
| 4,552,431 | 11/1985 | Allemand et al. | 350/96.31 |
| 4,586,785 | 5/1986 | Swinehart | 350/96.34 |
| 4,618,213 | 10/1986 | Chen | 350/96.34 |
| 4,637,025 | 1/1987 | Snitzer | 350/96.34 |
| 4,733,929 | 3/1988 | Brown | 350/96.34 |
| 4,747,662 | 5/1988 | Fitz | 350/96.34 |
| 4,752,115 | 6/1988 | Murray et al. | 350/96.29 |

Primary Examiner—William L. Sikes
Assistant Examiner—Robert E. Wise
Attorney, Agent, or Firm—Pretty, Schroeder, Brueggemann & Clark

[57] ABSTRACT

An apparatus and method for detecting and measuring optical fiber output by measuring backscatter fluorescence from at least a partial coating or layer of fluorescent material at approximately the end of the optical fiber.

5 Claims, 1 Drawing Sheet

OPTICAL FIBER POWER OUTPUT MEASURING MEANS

This application is a continuation of application Ser. No. 144,181, filed Jan. 15, 1988, now abandoned.

BACKGROUND OF THE INVENTION

1. Field of the Invention

This invention involves an apparatus and method for measuring light energy output from optical fibers, and more particularly for measuring backscatter fluorescence from the distal end of an optical fiber as a means for calculating light energy output.

2. Description of Related Art

Optical fibers can be used as a means of transmitting light energy from a generator light source to a target. A certain amount of light energy loss occurs in the optical fiber due to absorption and coupling losses with the light source at the proximal end. The absorption loss may not be uniform along the length of the fiber. The amount of absorption also varies with the length of the fiber. Because of the variability of energy absorption and coupling losses, output energy will not be the same as input energy from the generator light source.

Optical fibers are increasingly used with laser light sources, particularly in medical applications. In the past, output energy often has not been controlled. Instead, a particular "on" time and power level of the input laser energy have been selected, with monitoring of the results obtained by the output energy being qualitatively determined by such means as fluoroscopy. These optical fibers are used without any real energy output feedback system; the output energy is adjusted through trial and error. This creates a hazardous and even dangerous condition in situations where energy output should be measured precisely, such as within the human body.

One feedback system which does exist (as described in U.S. Pat. No. 4,648,892) measures backscatter fluorescence from laser light reflection off target material, back through the optical fiber. The energy output is then calculated from this backscatter fluorescence. The problem with this method of feedback control is that different target materials reflect spectral light differently. In addition, the amount of target material or the presence of more than one type of material in the target area will also cause different amounts of fluorescence. Therefore, calibration can be a significant problem, especially if the target material is within the human body. Thus, there is still a real need in the current art for a system of accurately measuring energy output from an optical fiber, particularly a laser optical fiber.

SUMMARY OF THE INVENTION

This invention involves an apparatus and method for measuring optical fiber light output. The apparatus consists of an optical fiber which contains at least a partial coating or layer of fluorescent material at approximately the distal end of the optical fiber. The fluorescent material absorbs a small fraction of the incident light energy, which causes the material to fluoresce. A portion of fluorescent light is transmitted back through the optical fiber toward the light source. This backscatter fluorescence can be detected and measured. The light energy output from the end of the optical fiber can then be calculated and the resulting value used to control the power of the light source.

These and other features and advantages of the invention will become more apparent upon consideration of the accompanying detailed description and drawings.

BRIEF DESCRIPTION OF THE DRAWINGS

Like reference numbers in the various figures refer to like elements.

DETAILED DESCRIPTION OF THE INVENTION

Figure 1:
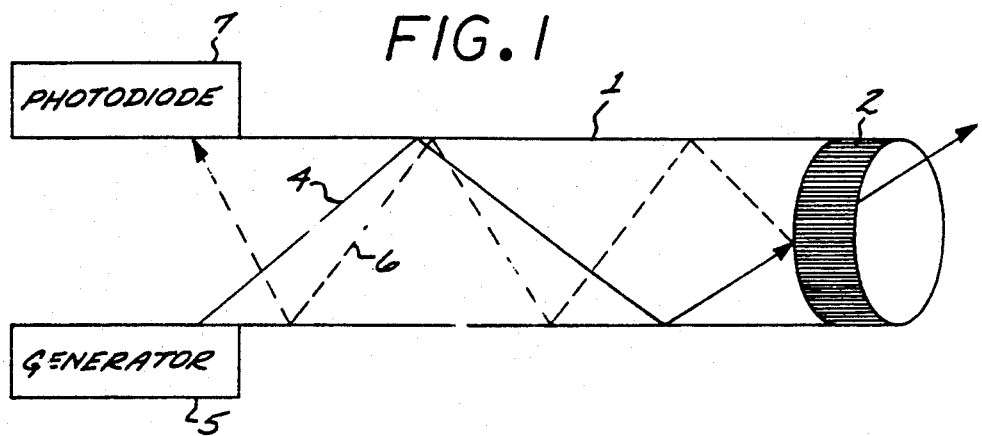
FIG. 1 is a perspective view of an optical fiber power output measuring means.

FIG. 1 depicts an apparatus for transmitting and measuring optical fiber output. The apparatus includes an optical fiber 1 with fluorescent material 2 around the outer circumference of the optical fiber near the distal end. This fluorescent material may be affixed to the optical fiber 1 by adhesive application onto the surface of the optical fiber 1, or implantation (such as ion implantation or diffusion) into the material of the optical fiber 1. Any suitable fluorescent material may be used, such as a rare earth element.

Figure 1A:
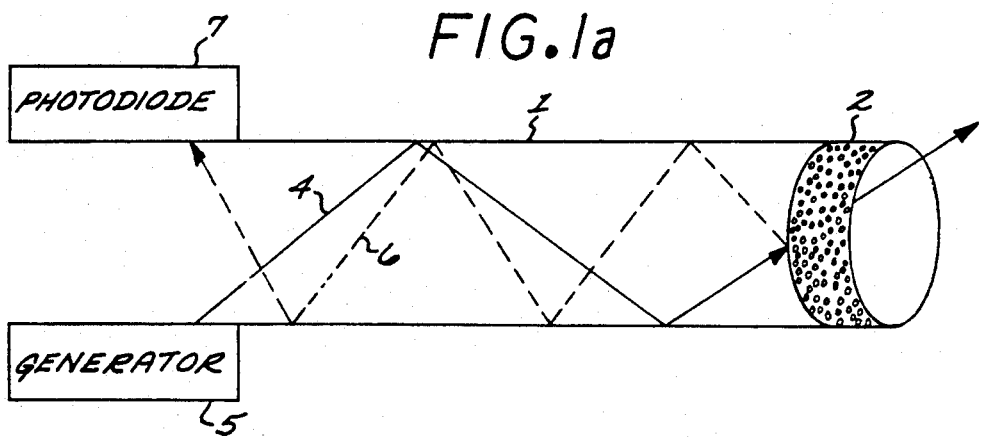
FIG. 1a is a perspective view of an alternate embodiment of the optical fiber output measuring means.

The preferred embodiment shows the fluorescent material applied to the optical fiber circumference in the shape of a narrow band. Other designs as well as incomplete configurations may be used to allow more of the incident light to pass, as shown in FIG. 1a.

Figure 2:
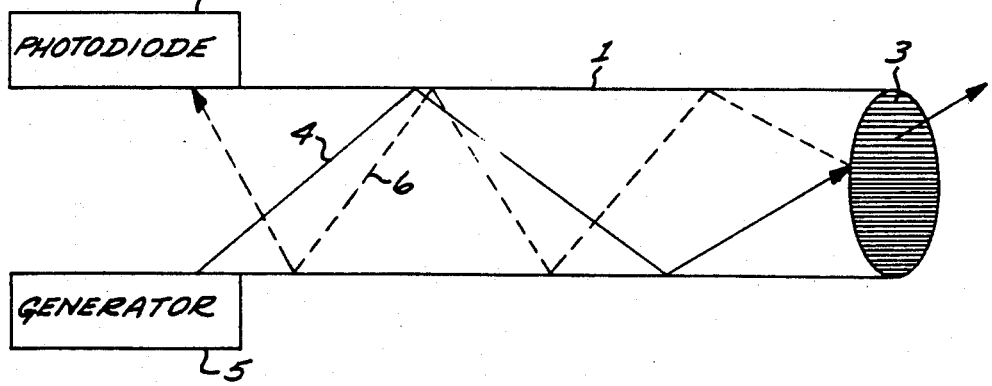
FIG. 2 is a perspective view of an alternate embodiment of the optical fiber power output measuring means.

FIG. 2 shows an alternate embodiment of the optical fiber power output measuring means. In this embodiment, the fluorescent material comprises a "cap" 3 at the distal end of the optical fiber 1. Again, the fluorescent material 3 may be affixed to the end of the optical fiber 1 by adhesive application or implanted into the optical fiber 1.

Figure 2A:
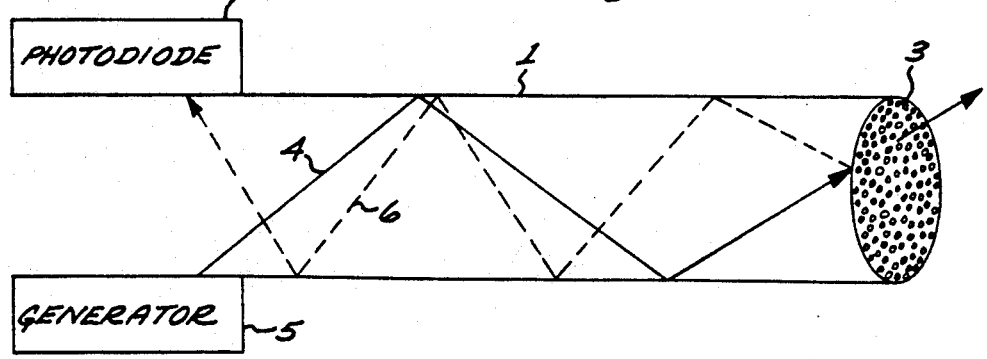
FIG. 2a is a perspective view of an alternate embodiment of the optical fiber output measuring means.

The fluorescent material in this embodiment is shown in the shape of a solid "cap" at the end of the optical fiber. Other designs as well as incomplete configurations may be used to allow more of the incident light to pass, as shown in FIG. 2a.

In both embodiments, incident light energy 4 is transmitted from a generator source 5 through the optical fiber 1. The fluorescent material absorbs a small fraction of the incident light energy 4. This causes the material to fluoresce in proportion to the energy of the incident light, and to transmit fluorescent light 6 back toward the light source. Light energy output from the end of the optical fiber 1 can then be calculated from the amount of backscatter fluorescence detected.

A photodiode, photomultiplier, or other detector 7, mounted near the input end of the optical fiber 1, can detect backscatter fluorescent light. The signal from the detector 7 can be coupled to any means for calculating or comparing, such as a computer. For example, a computer can store the information received from the detector 7 as a light intensity value. This value can be compared to an existing value already stored in the computer as a result of prior calibration and a difference characteristic can be determined indicative of the difference between the measured value and the stored value. The input energy can then be adjusted (manually or automatically by the computer) in response to the difference characteristic to maintain the desired output energy level. A detailed example of such a computer feedback system is described in U.S. Pat. No. 4,648,892.

By choosing a fluorescent material which fluoresces at a different wavelength than the target material, the feedback system can be easily calibrated before any contact is made with the target material. This invention, therefore, has the advantage of being more accurate and safer than the known feedback system of the prior art.

This invention has been described with reference to certain presently preferred embodiments. Various modifications of the preferred embodiments, as well as other embodiments of the invention, will be apparent to persons skilled in the art upon reference to this description. It is therefore contemplated that the appended claims will cover any modifications or embodiments that fall within the true scope of the invention.

We claim:

1. An optical fiber assembly adapted for use with a system for measuring the intensity of light transmitted by the assembly, comprising:

an optical fiber including a light-transmitting core and a protective cladding, wherein the fiber has a proximal end and a distal end; and a fluorescent material encircling the core of the optical fiber at or near the fiber's distal end, the fluorescent material absorbing a small portion of light transmitted along the fiber to its distal end and generating fluorescent light in response, substantially independent of any material located adjacent to the fiber's distal end, a portion of the fluorescent light being transmitted back along the optical fiber, from the fiber's distal end to the proximal end.

2. An optical fiber assembly as defined in claim 1, wherein the fluorescent material completely encircles the core of the optical fiber, forming a cylindrical band.

3. An optical fiber assembly as defined in claim 1, wherein the fluorescent material is applied by adhesion directly to the core of optical fiber.

4. An optical fiber assembly as defined in claim 1, wherein the fluorescent material is implanted into the cladding of the optical fiber.

5. An optical fiber assembly as defined in claim 1, and further including means for detecting the intensity of fluorescent light transmitted along the optical fiber, from the fiber's distal end to its proximal end.

* * * * *